United States Patent Office 3,465,058
Patented Sept. 2, 1969

3,465,058
CARBOXY TERMINATED LIQUID POLYBUTYL
ACRYLATE CURED WITH EPOXY RESIN
William J. McCarthy, Avon Lake, Ohio, assignor to The
B. F. Goodrich Company, New York, N.Y., a corporation of New York
No Drawing. Filed Dec. 21, 1967, Ser. No. 692,280
Int. Cl. C08g 45/04
U.S. Cl. 260—837                             1 Claim

ABSTRACT OF THE DISCLOSURE

Liquid butyl acrylate polymers can be given carboxyl termination. These functionally terminated polyacrylates can be cured to form long life pressure sensitive adhesives that resist creep by the addition of a polyglycidyl ether of a polyhydric phenol, alcohol or amine.

BACKGROUND OF THE INVENTION

Pressure sensitive adhesives are useful in the manufacture of flexible self-adhesive tapes, bands, labels, sheets and the like. They are used in manufacture of masking tapes, mending tapes and sealing tapes. Poly-n-butyl acrylate is known as an inherently pressure sensitive material.

Short comings of prior art pressure sensitive tapes including those based on butyl acrylate are cold flow, transferring, low internal strength and loss of tack.

Cold flow is the tendency for the adhesive to flow from the backing or bond line to adjacent areas. It causes dirt pick up, tack in locations where adhesion is not desired, and slippage in the bond line.

Transferring is the inability of a pressure sensitive adhesive to peel cleanly from the adherend. Such contamination of the adherend surface is caused by low internal strength of adhesive. Incompatible components in the adhesive, such as plasticizers, can cause this problem.

Low internal strength describes an undesirable property which causes adhesive to break, not at the adhesive-adherend interface, but within the adhesive.

Loss of tack on aging may be due to oxidation, crystallization, and overcure.

It would be desirable to overcome these deficiencies of prior art pressure sensitive adhesives by employing liquid polymers, which are convenient to use because neither solvent nor water is needed to obtain fluidity. The polymers can be compounded in equipment that is light in weight and lower in cost than the heavy mills and internal mixers used for high molecular weight solid polymers. A terminally functional polymer will have better rubbery physical properties than one where similar functionality is randomly placed. A cured polymer system will offer superior creep properties to those for systems based on thermoplastic, uncured polymers.

SUMMARY OF THE INVENTION

It has been discovered that polybutyl acrylates can be given reactive carboxyl functional groups at each end of the polymer chains. These functional carboxyl groups are introduced by copolymerization of acrylate monomer with an aliphatic azodicarboxylate in which the carbons attached to the azo groups are tertiary, such as azodicyanovaleric acid. These terminal functional groups can react with epoxy resins in the presence of amines to form cured products. Adhesiveness of the cured product can be varied from tacky to non-tacky by altering the proportions of polymer, epoxy resin, and amine. The tacky cures appear to retain adhesiveness indefinitely and to be dimensionally stable.

DETAILED DESCRIPTION

Carboxyl terminated polybutyl acrylates are obtained by free radical polymerization of the acrylate monomer in solvent with a bis-azocyano acid of the formula

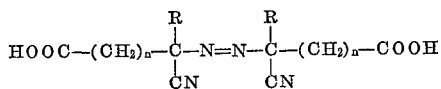

wherein R is an alkyl group of 1–3 carbon atoms and $n$ is an integer from 1 to 6. This process is known in the art and is disclosed in United States Patent 3,285,949.

The carboxyl terminated acrylate polymers described and used herein may be polymers with backbones derived from butyl acrylate or copolymers of butyl acrylate with a minor portion (less than 10% by weight based on the total weight of monomers employed) of ethyl acrylate, acrylonitrile, acrylic acid, methacrylic acid, diolefins such as butadiene, isoprene and dicyclopentadiene and the like. When ethyl acrylate is used as the predominant backbone monomer, low temperature properties are poor. For example, the glass transition temperature, $Tg$, of polyethyl acrylate is given as $-22°$ C., which is too high for many applications, while for polybutyl acrylate, $Tg$ is given as $-56°$ C. ("Mechanical Properties of Polymers," Reinhold Publishing Corp., 1962, p. 23). Acrylates primarily derived from $C_5$ and higher alcohols give polymers which are too soft and weak for use in pressure sensitive adhesive applications.

The functionally terminated polymers employed herein are cured by reactions with epoxy resins in the presence of amines. Elevated temperatures, if used, hasten the curing reaction. Tertiary amines such as 2,4,6-tri(dimethylaminoethyl) phenol or mixed amines such as triethylene tetramine are suitable. The quantity of amine is kept low to prevent overcure and consequent loss of tack. Two percent of amine based on the epoxy resin content gives good results.

Various epoxy resins may be employed. These resins are polymeric reaction products of polyfunctional halohydrins such as epihalohydrins with polyfunctional hydrogen-donating reactants such as polyfunctional phenols, alcohols, and amines. The major reaction is presumably a splitting out of hydrogen or metal halide with simultaneous opening and reaction of the epoxy rings. The resin molecule then contains functional hydroxy side groups, 1,2 epoxy end groups, and ethereal or ester linkages. The important common properties are the resinous character and the functional 1,2 epoxy and hydroxyl groups. Preparation of a polyepoxide resin is described in United States Patent 2,500,449. Epichlorohydrin is reacted with Bisphenol A at 100° C. in the presence of sufficient alkali to bind the hydrochloric acid formed. Other epoxy resins useful in this system are made by reacting an epihalohydrin with resorcinol, amino phenols, or aliphatic polyols such as glycerine. These resins are available commercially in a wide range of epoxy content, molecular weight, softening point and composition. They are activated in cure by basic catalysts such as tertiary amines.

Tertiary amines employed to activate the epoxy resin cure include trialkyl amine where the alkyl group has from 1–8 carbon atoms, mixed alkyl-aryl amines of the same characteristic, and aliphatic cyclic or heterocyclic amines or diamines having 4–10 carbon atoms. Specific examples include diethylene triamine, 2,4,6-tri(dimethylaminomethyl) phenol, trimethyl amine, triethyl amine, N-methyl morpholine, benzyl dimethyl aniline, N,N-diethyl aniline, triethylene diamine, 1,4-dimethyl piperazine, and tetramethyl guanidine.

In the following examples, parts are given as parts by weight unless otherwise stated.

Example I

Solvent, monomers, and catalyst are combined in a 15 gallon glass-lined polymerizer equipped with controls for agitation, temperature control and pressure control. An inert atmosphere of nitrogen is maintained during charging. Polymerizations run for 6 hours at 80° C. Part of the catalysis is added in the initial charge, and part 1 hour after polymerization has started. Charging and test data are set forth in Table 1.

TABLE 1

| Material | A | B | C |
|---|---|---|---|
| Butyl acrylate | 95 | 90 | 90 |
| Butadiene | 5 | 5 | 5 |
| Acrylonitrile | | 4.5 | 5 |
| Acrylic acid | | 0.5 | |
| ADVA [1] (start) | 8 | 10 | 10 |
| ADVA (at 1 hour) | 2 | 2 | 2 |
| Acetone | 300 | 300 | 300 |
| Percent conversion (total solids) | 93.0 | 95.0 | 95.0 |
| Ephr-carboxyl [2] | 0.036 | 0.049 | 0.041 |
| Percent bound acrylonitrile | 2.43 | 6.86 | 4.78 |
| Percent nitrogen | 0.64 | 1.81 | 1.26 |
| Functionality [3] | 1.145 | 1.55 | 1.33 |
| Mn-number average [4] | 3,180 | 3,168 | 3,090 |
| Glass transition temperature, Tg, °C., as measured by differential thermal analysis | −47 | −38 | |

[1] ADVA=Azodicyanovaleric acid.
[2] Ephr-carboxyl=equivalents per hundred parts rubber of carboxyl. Determined by titration of polymer solution with alcoholic KOH to phenolphthalein end point.
[3] Functionality of polymer is defined as the number of functional groups per molecule and is found by the formula:

$$\text{Functionality} = \frac{\text{ephr}}{\text{Molecular weight}} \cdot 100$$

[4] Mn-molecular weight run on Mechrolab Vapor Pressure Osmometer using MEK as solvent.

These carboxyl-terminated polybutyl acrylates are compounded for cure according to the recipe below with test results shown in Table 2. Cure is 16 hours at 105° C.

TABLE 2

| Material | D | E | F | G | H |
|---|---|---|---|---|---|
| Polymer A | 100 | | | | |
| Polymer B | | 100 | | 100 | |
| Polymer C | | | 100 | | 100 |
| Diglycidyl ether of Bisphenol A | 9.7 | 11 | 9.2 | 11 | 9.2 |
| 2,4,6-tri(dimethylamino-methyl)phenol | .19 | .22 | .18 | .22 | .18 |
| Alkyl-aromatic polyindene synthetic resin. Softening point=10° C | | | | 15 | 15 |
| Tensile shear, p.s.i. (0.5 inch overlap, one inch wide, pulled in shear at 12″ per min. Steel to steel bond) | 36 | 55 | 60 | 44 | |

Creep is tested by spreading the recipe on a carbon steel plate to a depth of 7 mils and curing 16 hours at 105° C. Steel chips, 1″ x 2″, are pressed onto the cured adhesive with a rubber roller so that ½ the chip area is adhered to the plate and ½ the area overhangs the plate. The plate is suspended in a vertical position and weights are hung from the chips putting a stress on the one square inch of bond line.

E and F support a 1000 gram weight for four hours with no evidence of failure or creep.

D, E, F and G support 220 grams at room temperature for two weeks with no failure.

F holds 220 grams at 242° F. for 72 hours with no failure.

A good pressure sensitive adhesive should develop at least 35 p.s.i. tensile shear, and in the creep test should hold 200 grams at 158° F. for 15 minutes. Temperature is then raised 10° F. every 15 minutes until failure occurs; the bond must not fail below 220° F.

The polymers A, B and C are compounded with carbon black, and the epoxy resin and amine employed in recipes D, E, and F as follows.

TABLE 3

| Material | G | H | I |
|---|---|---|---|
| Polymer A | 100 | | |
| Polymer B | | 100 | |
| Polymer C | | | 100 |
| Carbon black | 25 | 25 | 25 |
| Diglycidyl ether of Bisphenol A | 8.1 | 11.05 | 9.22 |
| 2,4,6-tri(dimethyl-aminomethyl) phenol | 0.49 | 0.663 | 0.533 |

The mixes are cured 16 hours at 105° C. with the following physical test results:

| | G | H | I |
|---|---|---|---|
| Tensile, p.s.i. | 248 | 321 | 236 |
| Elongation, percent | 245 | 127 | 250 |

Polymers A, B and C, as formulated in D, E, F, G and H are used to make Mylar to aluminum peel adhesion samples. Mylar is a synthetic film produced by E. I. du Pont de Nemours and Company and is a polyethylene terephthalate cast as film and bilaterally stretched.

For comparison with the data in Table 4, 32 ounces per inch is a common requirement of peel adhesion for masking tape. The recipes are spread on a 4 mil aluminum foil sheet to a thickness of 7 mils, cured for 16 hours at 105° C., then covered with Mylar film, 2 mils thick, applied by the pressure of a soft rubber roller (approximately 4 pounds per inch of width pressure being applied by moving the roller at about 12 inches per minute).

Five samples, 1″ x 6″, of each recipe are pulled at 12″ per minute in a Thwing-Albert Tester in 180° peel and the median results are reported.

TABLE 4

| | D | E | F | G | H |
|---|---|---|---|---|---|
| Polymer | A | B | C | B | C |
| Adhesion, ounces per inch | 38 | 52 | 88 | 50 | 99 |

The data indicate that carboxyl-terminated liquid polymers of butyl acrylate, compounded with liquid epoxy resin and amine activator cure to form materials that are excellent for use as pressure sensitive adhesive films. The cured polymers resist creep and have superior adhesive strength.

I claim:
1. A pressure sensitive, creep resistant adhesive material comprising a carboxyl terminated liquid polybutyl acrylate backbone polymer wherein at least 90% by weight of the monomer units are derived from butyl acrylate, said polmer being cured by reaction with a liquid epoxy resin selected from the class consisting of polymeric reaction products of polyfunctional halohydrins with hydrogen donating reactants selected from the class consisting of polyfunctional phenols, alcohols and amines in the presence of a tertiary amine activator.

References Cited

UNITED STATES PATENTS 3,208,980   9/1965   Gruver _____ 260—836
3,285,949   11/1966   Siebert _____ 260—192

MURRAY TILLMAN, Primary Examiner
PAUL LIEBERMAN, Assistant Examiner

U.S. Cl. X.R.

260—2, 836, 47, 89.5, 86.1, 83.5, 85.5, 80.7, 80.8, 829, 41